United States Patent [11] 3,615,546

| [72] | Inventors | Henri Depoorter;<br>Marcel Jan Libeer, Mortsel, Belgium; Guy Alfred Rillaers, Kontich, Germany |
|---|---|---|
| [21] | Appl. No. | 733,359 |
| [22] | Filed | May 31, 1968 |
| [45] | Patented | Oct. 26, 1971 |
| [73] | Assignee | Gevaert-Agfa N.V.<br>Mortsel, Belgium |
| [32] | Priority | June 16, 1967 |
| [33] | | Great Britain |
| [31] | | 27,910/67 |

[54] PHOTOGRAPHIC ELEMENTS CONTAINING COLORED COLLOID LAYERS
9 Claims, 1 Drawing Fig.

| [52] | U.S. Cl. | 96/84 R, 260/240.9, 252/300 |
|---|---|---|
| [51] | Int. Cl. | G03c 1/84 |
| [50] | Field of Search | 96/84 |

[56] References Cited
UNITED STATES PATENTS

| 3,316,091 | 4/1967 | Rossi et al. | 96/84 |
|---|---|---|---|
| 3,485,632 | 12/1969 | Ohlschlager et al. | 96/84 |

*Primary Examiner*—Ronald H. Smith
*Attorney*—Alfred W. Breiner

ABSTRACT: A light-sensitive photographic material including a support and a light-sensitive layer and/or a water-permeable colloidal layer containing a dye obtained by condensation of para-aminobenzaldehydes or cinnamaldehydes with 1-phenyl-2-pyrazolin-5-ones which dyes are characterized by the presence in the 1-phenyl group of an arylsulphonyl substituent and by the presence in the dyestuff molecule of at least one carboxyl and/or sulpho group in acid or salt form are described. The photographic materials have improved light-screening properties.

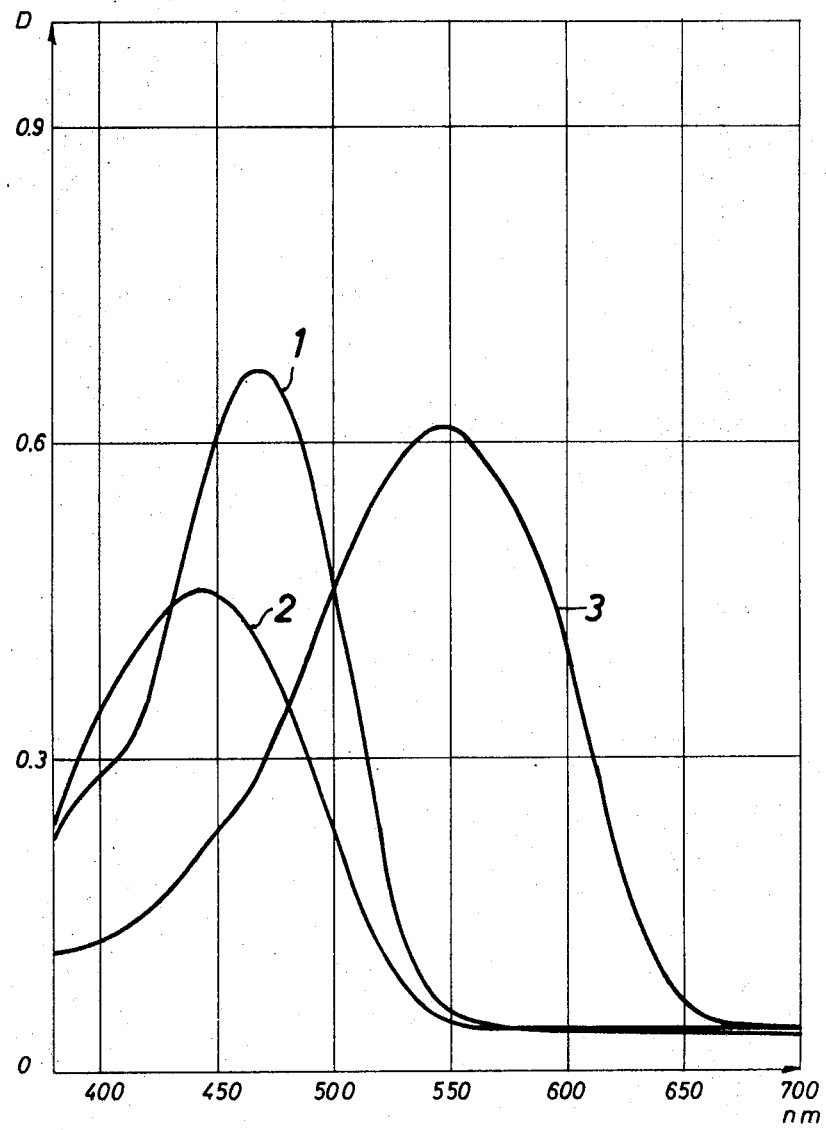

PHOTOGRAPHIC ELEMENTS CONTAINING COLORED COLLOID LAYERS

This invention relates to new methine dyes, to their preparation, to their use in photographic materials and to materials containing said dyes.

It is known for many purposes to incorporate light-screening dyes into photographic elements. Such a light-Screening dye may be used as filter dye in a layer coated over one or more light-sensitive emulsion layers or between two emulsion layers e.g. differently color sensitized emulsion layers to protect the underlying light-sensitive emulsion layer(s) from the action of light of wavelength absorbed by such light-screening dye or it may be used as screening dye in a light-sensitive emulsion layer for the purpose of modifying a light record in such emulsion layer or it may be used as antihalation dye in a layer not containing a light-sensitive substance known as antihalation layer situated on either side of the support carrying the light-sensitive emulsion layer(s).

Numerous compounds have been employed as light-screening dyes for the purposes given above. Many adversely effect the sensitivity of the light-sensitive emulsions with which they come into contact and others are less suitable in that they are not easily discharged or incompletely discharged in the processing solutions. For instance, amongst the light-screening dyes that are widely employed nowadays in photographic elements dyes obtained by condensation of 2-pyrazolin-5-ones with p-amino-benzaldehydes or cinnamaldehydes are important representatives. These dyes, however, have an important disadvantage in that they are decolorized rather slowly or incompletely in the processing solutions.

According to the present invention novel light-screening dyes obtained by condensation of p-aminobenzaldehydes or cinnamaldehydes with 1-phenyl-2-pyrazolin-5-ones are provided for use as filter dyes and antihalation dyes in photographic non light-sensitive colloid layers and as screening dyes in photographic light-sensitive emulsion layers, which dyes are characterized by the presence in the 1-phenyl group of an arylsulphonyl substituent and by the presence in the dyestuff molecule of at least one carboxyl and/or sulfo group in acid or salt form.

The novel light-screening dyes according to the present invention can be represented more particularly by the following general formula:

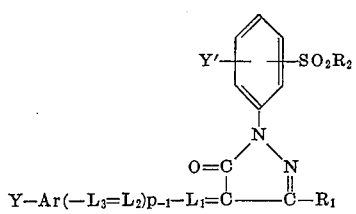

wherein:
$R_1$ represents an alkyl group including a substituted alkyl group e.g. methyl or hexadecyl, an aralkyl group including a substituted aralkyl group or an aryl group including a substituted aryl group e.g. a phenyl group or a phenyl group substituted by an alkyl group, a substituted alkyl group, an aryl group, a substituted aryl group, a hydroxy group, an alkoxy group, a halogen atom such as chlorine atom, a nitro group, an alkoxy carbonyl group, a carboxyl group, a cyano group, a sulfo group, an alkyl sulfonyl group, a carbamoyl group, a carbonamido group, a sulfamoyl group, a sulfonamido group, an amino group, a substituted amino group, a mercapto group or an alkyl thio group, $R_2$ represents an aryl group including a substituted aryl group e.g. a phenyl group or a phenyl group substituted by an alkyl group, a substituted alkyl group, an aryl group, a substituted aryl group, a hydroxy group, an alkoxy group, a halogen atom such as a chlorine atom, a nitro group, an alkoxy carbonyl group, an carboxyl group, a cyano group, a sulfo group, an alkyl sulfonyl group, a carbamoyl group, a carbonamido group, a sulfamoyl group, a sulfonamido group, an amino group, a substituted amino group, a mercapto group or an alkyl thio group, each of $L_1$ $L_2$ and $L_3$ (same or different) represents a methine radical or substituted methine radical, e.g. a methine radical substituted by alkyl, aralkyl or aryl, $Y'$ represents a hydrogen atom, or a substituent, e.g. a carboxyl group, an alkoxycarbonyl group, an alkyl carbonyl group, an arylcarbonyl group or a sulpho group, $Ar$ represents an arylene nucleus including a substituted arylene nucleus or an arylene nucleus condensed to for a fused ring system, preferably however a phenylene radical, which may be substituted e.g. with an alkyl group, a substituted alkyl group, an aryl group, a substituted aryl group, a hydroxyl group, an alkoxy group, a halogen atom, a nitro group, an alkoxycarbonyl group, a carboxyl group, a cyano group, a sulfo group, an alkylsulfonyl group, a carbamoyl group, a carbonamido group, a sulfamoyl group, a sulfonamido group, an amino group, a substituted amino group, a mercapto group, or an alkyl thio group, $p$ represents 1 or 2, an $Y$ represents an amino group or a substituted amino group e.g.

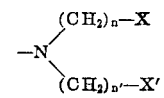

wherein:
each of $n$ and $n'$ stands for 1, 2 or 3, and
each of $X$ and $X'$ (the same or different) represents a hydrogen atom, a cyano group, a carboxyl group, a sulfo group, a halogen atom e.g. chlorine, an alkoxy group, an alkyl thio group, an alkoxycarbonyl group, an aryloxycarbonyl group, an amino group, a substituted amino group e.g. dimethylamino, a quaternary ammonium group, a — $SO_2R_3$ group wherein $R_3$ represents alkyl including substituted alkyl, aralkyl including substituted arakyl or aryl including substituted aryl, the dyestuff molecule containing at least one carboxyl and/or sulfo group in acid or salt form e.g. alkali-metal salt, ammonium salt, alkaline earth metal salt, organic amine salt such as pyridine salt, etc.

The dyes of use according to the present invention meet the severe demands that are made on antihalation dyes, filter dyes and screening dyes for photographic silver halide materials, in other words, they do not desensitize or fog a light-sensitive silver halide emulsion, are well miscible with a photographic colloid, e.g. gelatin, can easily be incorporated into the photographic material, possess an intensive tinctorial power and are discharged quickly, completely and irreversibly without formation of colored degradation products in an alkaline or acid-reducing medium, such as an alkaline photographic developing bath or an acid fixing bath containing sodium hydrogen sulfite. Apart from being discharged quickly without leaving a residual color, the methine from being according to the present invention are characterized by being quite stable in the coating compositions even in the presence of all sorts of other ingredients such as hardeners, coating aids, etc.

In the following table are listed some representative dyestuffs according to the present invention. The absorption characteristics of the dyes are also given

TABLE
| Dyestuff formula | λ max.* (nm.) | ε·10⁻⁴ |
|---|---|---|
| 1.... 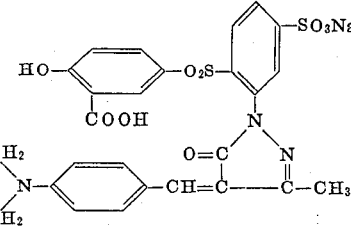 | 446 | 2.30 |
| 2.... 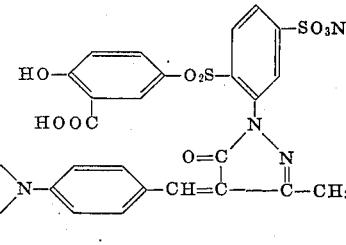 | 475 | 4.20 |
| 3.... 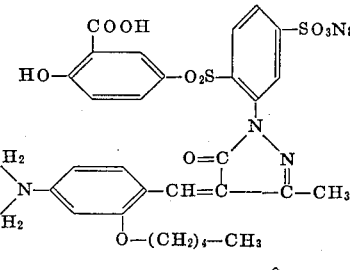 | 463 | 2.70 |
| 4.... 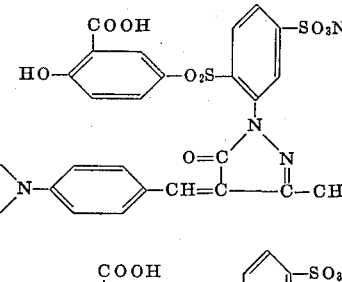 | 447 | 1.80 |
| 5.... 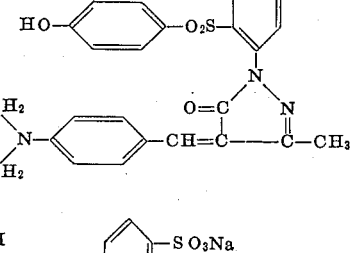 | 475 | 3.33 |
| 6.... 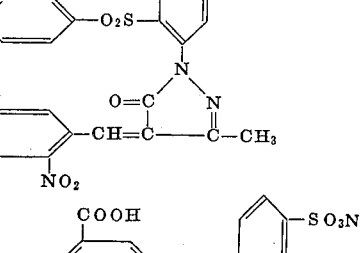 | 440 | 1.44 |
| 7.... 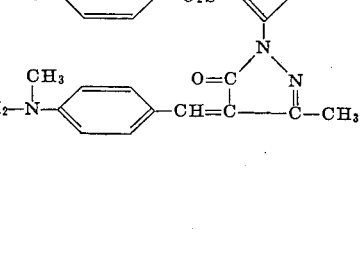 | 460 | 2.43 |

TABLE

| | Dyestuff formula | λ max.* (nm.) | ε·10⁻⁴ |
|---|---|---|---|
| 8 | (structure) | 510-525 | 1.71 |
| 9 | (structure) | 477 | 3.62 |
| 10 | (structure) | 451 | 3.04 |
| 11 | (structure) | 457 | 1.02 |

*Measured in methanolic solution.

The dyes according to the present invention can be prepared by allowing to react a compound of general formula II:

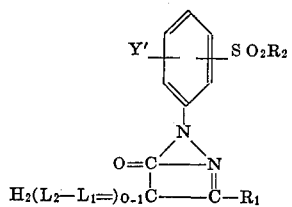

with a compound of general formula III $Y-Ar-(L_3=L_2-)_{p_{11}}L_1=O$  III wherein $R_1$ $R_2$ $Y$ $Y'$ $Ar$ $p$ $L_1$ $L_2$ and $L_3$ have the same significance as above and $q$ is 1 or 2 but is 1 when $p=2$.

The reaction can be carried out by heating a mixture of compounds II and III in the presence of a basic condensing agent such as sodium acetate or pyridine. The reaction can also occur in an inert diluent such as methanol, ethanol, ethyleneglycol monomethylether, acetonitrile, dimethyl sulfoxide tetrahydrothiophene-1 1-dioxide or dimethyl formamide, either or not in the presence of a basic condensing agent.

The intermediates of formula II with $q=1$ can be prepared by known methods starting from intermediates used in dyestuff chemistry, for instance by condenstion of the appropriate phenyl hydrazine with the appropriate substituted or unsubstituted keto-carboxylic acid ester e.g. an acetoacetic acid ester, a benzoyl acetic acid ester, etc. Some of the intermediates of formula II with $q=1$ are commercially available products, such as 1-[2-(3-carboxy-4-hydroxy-phenyl-sulfonyl-5-sulpho-phenyl]-3-methyl-2-pyrazolin-5one marketed under 5trade name SULFONPYRAZOLON by Farbwerke Hoechst, Hoechst-Frankfurt, W. Germany.

The intermediates of formula II with $q=2$ can be obtained as known in the art by condensation of a product of formula II with $q=1$ and a dialkyl ketone, an alkyl aryl ketone or an aliphatic aldehyde.

The following preparation illustrates how the intermediates of formula II can be prepared.

PREPARATION 1

1-[2-(m-carboxyphenyloulphonyl)--(m-carboxyphenyl-sulphonyl)-5-sulphophenyl]-4-p-pentyloxyphenyl-2-pyrazolin-5-one corresponding to the formula:

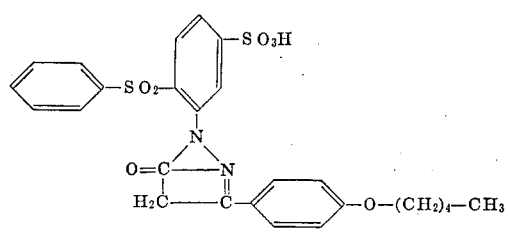

was prepared as follows:

Five g. of 3-carboxy-4-sulpho-2-hydrazino-diphenyl sulfone are dissolved in 100 ml. of water in the presence of 3 g. of sodium carbonate. The solution was neutralized by addition of 20 ml. of acetic acid whereupon a solution of 3.5 g. of p-pentyloxybenzoylacetic acid methyl ester in 25 ml. of acetic acid was added and the whole was boiled for 7 hours. Then the reaction mixture is acidified with 10 ml. of concentrated hydrochloric acid. The pyrazolinone that precipitates contains some salt but is used without further purification. Yield: 66 percent.

The 3'-carboxy-4-sulpho-2-hydrazino-diphenyl sulfone used in the above preparation can be obtained by the reduction with sodium sulfite of the corresponding diazonium salt derived from the amino compound. The amino compound is obtained by reduction of 3'-carboxy-4-sulpho-2-nitrodiphenyl sulfone with iron filings and hydrochloric acid. The nitro compound is prepared by condensation of -carboxybenzene sulfinic acid with 4-chloro-3-nitrobenzene sulfonic acid in water and in the presence of sodium hydroxide.

The aldehydes of formula III wherein $b=1$ can be prepared from the corresponding substituted anilines according to the Vilsmeier and Haack reaction (Ber. 60, 119, 1927) using dimethylformamide as formulating agent whereas those wherein $p=2$ can be prepared analogously to the Vilsmeir reaction as described by C. Yutz, Ber. 91, 850 (1958) with N-methylanilino-propene(1)-al(3) and the appropriate anilines. However, 3-nitro-4-dimethylamino-benzaldehyde is prepared from 4-dimethylamino-benzaldehyde by nitration at 0°–10° C. in a nitric acid (sp. gr. 1.40)/sulfuric acid (sp. gr. 1.84) mixture according to Friedlander IV, 141. The preparation of other aldehydes not prepared directly according to the method of Vilsmeir and Haack can be found in United Kingdom copending application 27,911/67.

The substituted anilines can be prepared by methods well known in organic chemistry and described in the literature. Details as to the preparation of such anilines can be found amongst others in the above copending application.

The following illustrates more particularly how the dyes according to the present invention can be prepared:

PREPARATION 2.

The dye corresponding to formula 1 of the above list is prepared as follows:

28.8 g. of SULFONPYRAZOLON (trade name) were dissolved in 75 ml. of dimethyl formamide. To the solution obtained 8.8 g. of sodium acetate-3-water and 11.4 g. of p-bis($\beta$-cyano-ethyl)-aminobenzaldehyde were added. The reaction mixture was refluxed for 30 minutes and then cooled whereupon the dyestuff was precipitated with ether. The tacky product was repeatedly washed until it became solid. Finally the dyestuff was digiested in 200 ml. of methanol and dried. Yield 24 g.

PREPARATION 3

The dye corresponding to formula 2 of the above list is prepared as follows:

To a solution of 130 g. of SULFONPYRAZOLON (trade name) in 200 ml. of dimethyl formamide 16 g. of sodium hydroxide, dissolved in a little water, were added. Then a solution of 36 g. of p-dimethylamino-benzaldehyde in 50 ml. of dimethyl formamide was added whereupon the reaction mixture was refluxed for 1 hour. After cooling the dyestuff was precipitated by means of ether and finally recrystallised from methanol/acetone. Yield 77 g.

PREPARATION 4

The dye corresponding to formula 8 of the above list is prepared as follows:

23 g. of SULFONPYRAZOLON (trade name) and 9 g. of p-dimethylamino cinnamaldehyde in 250 ml. of ethylene glycol monomethyl ether were refluxed for 1 hour whereupon the reaction mixture was evaporated under reduced pressure until dry. The tacky residue was digested in acetone and the solid product obtained was stirred with 300 ml. of boiling water, filtered by suction and finally rinsed with acetone. Yield 8.7 g.

PREPARATION 5

The dye corresponding to formula 2 but now under the form of its pyridine salt instead of the sodium salt is prepared as follows:

In a 1 liter reaction vessel fitted with a stirrer, a reflux condenser and a heating jacket were placed while stirring and heating till the boiling point of the mixture was reached: 450 ml. of anhydrous ethanol, 100 ml. of pyridine, 91.8 g. (0.2 mol) of sulfonpyrazolon (trade name) and 32.2 g. (0.22 mol) of p-dimethylamino-benzaldehyde. Refluxing of the mixture was continued for 3½ hours while stirring. The mixture was then kept standing overnight whereupon the crystals formed were filtered by suction, washed with alcohol and dried at about 85° C. Yield: 124.7 g. (94 percent). Absorption maximum in methanol: 472–475 nm ($\epsilon = 3.60 a P 10^4$).

PREPARATION 6

The dye corresponding to formula 4 is prepared as follows

A mixture of 5.1 g. (0.01 mol) of sulfonpyrazolon (trade name) in the form of its free sulfonic acid, 1.4 g. (0.01 mol) of crystalline sodium acetate and 25.7 g. (0.01 mol) of p-N,N-bismethoxycarbonylmethylaminobenzaldehyde is boiled for 1 hour in 50 ml. of ethylene glycol monomethyl ether. The reaction mixture is evaporated to dryness under reduced pressure and the sticky residue is recrystallized from 50 ml. of ethanol. Yield: 69 percent.

The dyestuffs according to the invention can be applied in any photographic material based on light-sensitive silver halide where easily dischargeable dyestuffs are desired or necessary. Examples of applications of these dyes are: in an antihalation layer e.g. between the support and a light-sensitive silver halide emulsion layer or at the backside of the support, in a filter layer above or between two light-sensitive silver halide emulsion layers or as screening dye in a light-sensitive layer. Said dyestuffs when used as screening dyes in a light-sensitive silver halide emulsion layer do not or practically do not decrease the inherent and/or spectral sensitivity of the silver halide emulsion layer.

The dyes according to the present invention can be incorporated into a photographic material according to any technique known by those skilled in the art. For instance the dyes can be dissolved in an appropriate solvent, which is in most cases water, and then dispersed, occasionally in the presence of a wetting agent, in a hydrophilic colloid composition forming or forming part of the binding agent of the colloid layer into which the dyes are intended to be incorporated. They hydrophilic colloid composition may of course comprise in addition to the colloid carrier, which is mostly gelatin, all other sorts of ingredients, e.g. coating aids and hardening agents. The dispersion thus obtained can then be applied as a layer according to known processes.

The dye solution need not necessarily be dispersed directly in the hydrophilic colloid composition ready for coating. Said solution may advantageously be first dispersed in an aqueous hydrophilic colloid solution whereupon the resultant mixture can be stored and then after the occasional removal of the solvents, intimately mixed with the colloid composition ready for coating.

The colloids or mixtures of colloids used in the hydrophilic colloid compositions, into which the dye solutions are dispersed may be of any type as commonly used in photographic materials e.g. gelatin, casein, polyvinyl alcohol, carboxymethyl cellulose, sodium alginate, poly-N-vinyl-pyrolidone, etc. gelatin being however favored.

The following example illustrates the present invention.

EXAMPLE

Coating solutions are prepared having the following composition:

inert gelatin—48 g.
dyestuff as listed in the table below
saponine—0.75 g.
4 percent aqueous solution of formaldehyde—1 ml.
distilled water to make—1,000 ml.

After adjustment of the pH to a value given in the table hereinafter the solutions are coated on conventional supports provided with a subbing layer at a rate of 125 g./sq.m. so that per square meter 6 g. of gelatin and the given amounts of dyestuff are present.

The absorption maxima and the corresponding optical densities of the gelatin layers obtained are listed in the table below.

These gelatin layers are rapidly and completely discolored upon treatment with common photographic black-and-white or color processing baths, even in the "lith"-type of developing baths.

TABLE

| Dyestuff of formula: | Mg. dyestuff per sq. m. | $\lambda_{max.}$ (nm.) | Corresponding optical density | pH |
| --- | --- | --- | --- | --- |
| 1 | 240 | 455 | 0.47 | 5.8 |
| 2 | 120 | 488 | 0.70 | 5.9 |
| 3 | 200 | 468 | 0.67 | 5.75 |
| 4 | 200 | 455 | 0.53 | 5.8 |
| 5 | 200 | 470 | 0.69 | 5.8 |
| 6 | 200 | 442 | 0.46 | 5.8 |
| 7 | 200 | 480 | 0.84 | 5.85 |
| 8 | 200 | 545 | 0.62 | 5.7 |
| 9 | 50 | 470 | 0.27 | 5.8 |

In the accompanying drawing the absorption curves 1, 2 and 3 are the absorption curves of the gelatin layers containing dyestuffs 3, 6 and 8 respectively. Absorption curve 1 can be regarded as representative for the absorption curves of the gelatin layers containing dyes 1, 2, 4, 5, 7 and 9 which are of analogous form apart from the absorption maximum and corresponding optical density.

We claim:

1. A light-sensitive element comprising a support and a layer of light-sensitive material containing a dye having the formula:

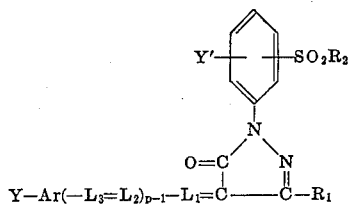

wherein:
$R_1$ represents an alkyl group, an aralkyl group, or an aryl group,
$R_2$ represents an aryl group,
each of $L_1$, $L_2$ and $L_3$ represents a methine group
$Y'$ represents hydrogen or a substituent selected from a sulfo group, a carboxyl group, an alkoxycarbonyl group, an alkylcarbonyl group or an arylcarbonyl group,
$p$ represents 1 or 2,
$Ar$ represents an arylene nucleus or an arylene nucleus condensed to form a fused ring system, and
$Y$ represents an amino group
the dyestuff molecule containing at least one sulfo group and/or carboxyl group in the free acid form or in the salt form.

2. The light-sensitive element of claim 1 wherein $Y$ represents the group

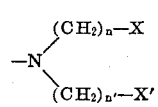

wherein each of $X$ and $X'$ (the same or different) stands for hydrogen, halogen, cyano, carboxyl, sulfo, an alkoxy group, an alkylthio group, an alkoxycarbonyl group, an amino group, a quaternary ammonium group, or the group $—SO_2R_3$ wherein $R_3$ stands for an alkyl group, an aralkyl group or an aryl group and each of $n$ and $n'$ stands for 1, 2 or 3.

3. A light-sensitive element comprising a support, a light-sensitive material, and at least one water permeable colloid layer containing a dye corresponding to the formula

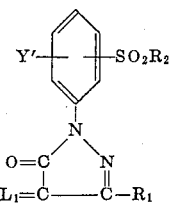

wherein:
$R_1$ represents an alkyl group, an aralkyl group, or an aryl group,
$R_2$ represents an aryl group,
each of $L_1$, $L_2$ and $L_3$ represents a methine group
$Y'$ represents hydrogen or a substituent selected from a sulfo group, a carboxyl group, an alkoxycarbonyl group, an alkylcarbonyl group or an arylcarbonyl group,
$p$ represents 1 or 2.
$Ar$ represents an arylene nucleus or an arylene nucleus condensed to form a fused ring system, and
$Y$ represents an amino group
the dyestuff molecule containing at least one sulfo group and/or carboxyl group in the free acid form or in the salt form.

4. A light-sensitive element according to claim 3 wherein $Y$ represents the group $$-N\begin{matrix}(CH_2)_n-X\\(CH_2)_{n'}-X'\end{matrix}$$

wherein each of $X$ and $X'$ (the same or different) stands for hydrogen, halogen, cyano, carboxyl, sulfo, an alkoxy group, an alkylthio group, an alkoxycarbonyl group, an aryloxycarbonyl group, an amino group, a quaternary ammonium group, or the group $—SO_2R_3$ wherein $R_3$ stands for an alkyl group, an aralkyl group or an aryl group and each of $n$ and $n'$ stands for 1, 2 or 3.

5. The light-sensitive element according to claim 3 wherein the said water-permeable colloid layer containing the said dye is an antihalation layer coated either on the back of the support or between the support and a light-sensitive silver halide emulsion layer.

6. The light-sensitive element according to claim 3 including at least one light-sensitive silver halide emulsion layer.

7. A light-sensitive element according to claim 3 wherein said layer is part of a light-sensitive photographic multilayer silver halide color material and functions as a filter layer or antihalation layer.

8. A light-sensitive element according to claim 3 wherein said layer is a light-sensitive silver-halide emulsion layer forming part of a photographic silver halide material.

9. A light-sensitive element according to claim 3 wherein the light-sensitive material is included in said water-permeable colloid layer.

* * * * *

UNITED STATES PATENT OFFICE
CERTIFICATE OF CORRECTION

Patent No. 3,615,546           Dated   October 26, 1971

Inventor(s) HENRI DEPOORTER ET AL

It is certified that error appears in the above-identified patent and that said Letters Patent are hereby corrected as shown below:

Column 1, line 67, after "as" insert -- a --. Column 2, line 17, "for" should read -- form --; Column 2, line 28, "an" should read -- and --; Column 2, line 69, "from being" should read -- dyes --. Column 3, Formula 6, the formula should appear as follows:

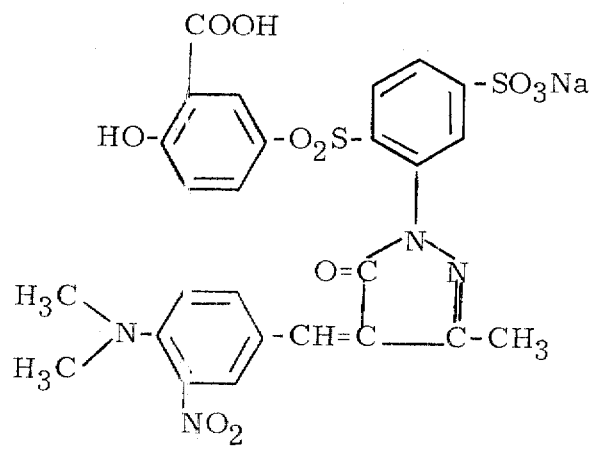

Page 1

UNITED STATES PATENT OFFICE
CERTIFICATE OF CORRECTION

Patent No. 3,615,546          Dated October 26, 1971

Inventor(s) HENRI DEPOORTER ET AL

It is certified that error appears in the above-identified patent and that said Letters Patent are hereby corrected as shown below:

Column 5, Formula 10, the formula should appear as follows:

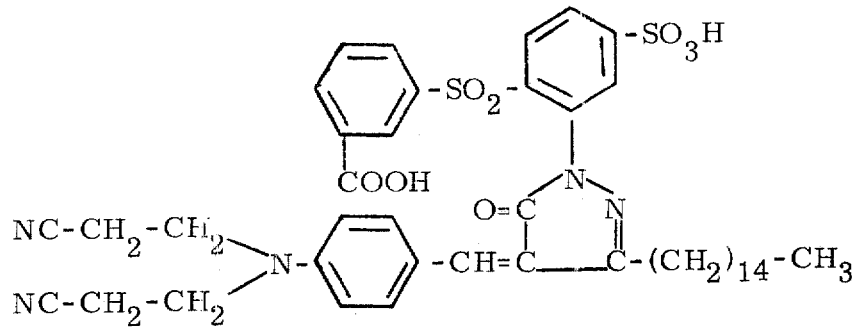

Column 5, lines 48 - 57, the formula should appear as follows:

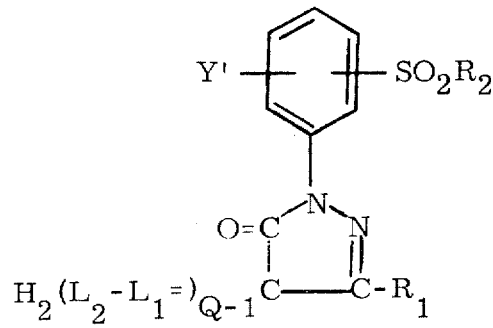

Page 2

UNITED STATES PATENT OFFICE
CERTIFICATE OF CORRECTION

Patent No. 3,615,546                Dated October 26, 1971

Inventor(s) HENRI DE POORTER ET AL

It is certified that error appears in the above-identified patent and that said Letters Patent are hereby corrected as shown below:

Column 5, line 60, "Y-Ar-$(L_3=L_2-)_{p11}L_1 = 0$" should read -- Y-Ar-$(L_3=L_2-)_{p-1}L_1=0$ --; Column 5, line 62, "p=2. 1" should read -- p=2. --; Column 5, line 68, "tetrahydrothiophene-1 1-dioxide" should read -- tetrahydrothiophene-1, 1-dioxide --. Column 6, line 47, after "-sulfonyl" insert -- ) --; Column 6, line 49, "5trade" should read -- the trade --; Column 6, line 60, delete "(m-carboxyphenyloulphonyl)-"; Column 6, lines 65 - 73, the formula should appear as follows:

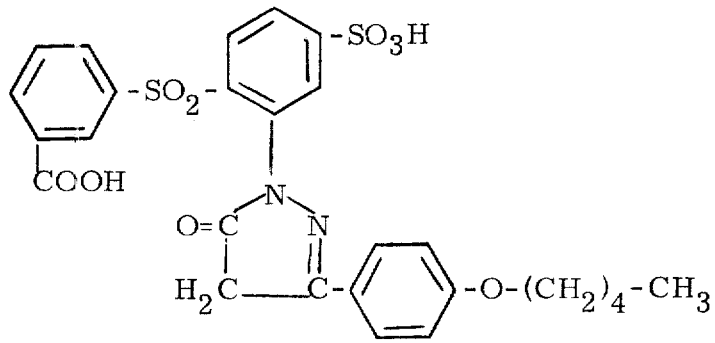

Column 7, line 17, "-carboxybenzene" should read -- 3-carboxybenzene --; Column 7, line 20, "b=1" should read -- p=1 --; Column 7, line 23, "formulating" should read -- formylating --; Column 7, line 24, "Vilsmeir" should read -- Vilsmeier --; Column 7, line 32, "Vilsmeir" should read -- Vilsmeier --; Column 7, line 52 "digiested" should read -- digested --. Column 8, line 20 "($\epsilon$=3.60aP$10^4$)" should read -- ($\epsilon$=3.60 x $10^4$) --; Column 8, line 25, "(trade)" should read -- (trade --. Column 10, line 3, claim 2, after "an alkoxycarbonyl group," insert -- an aryloxycarbonyl group, --; Column 10, lines 10 - 20, claim 3, Page 3

UNITED STATES PATENT OFFICE
CERTIFICATE OF CORRECTION

Patent No. 3,615,546  Dated October 26, 1971

Inventor(s) HENRI DEPOORTER ET AL

It is certified that error appears in the above-identified patent and that said Letters Patent are hereby corrected as shown below:

the formula should appear as follows:

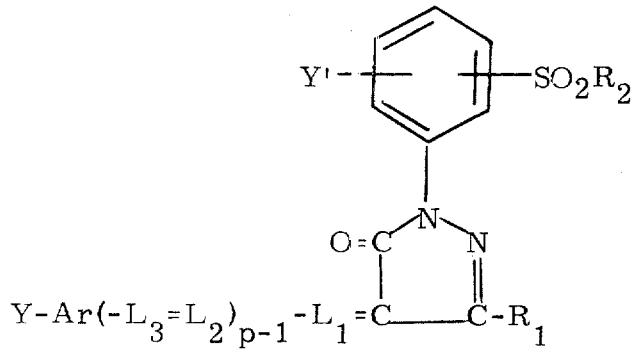

Column 10, line 67, claim 7, after "or" delete -- a --.

Signed and sealed this 20th day of November 1973.

(SEAL)
Attest:

EDWARD M. FLETCHER, JR.
Attesting Officer

RENE D. TEGTMEYER
Acting Commissioner of Patents